US010699022B1

(12) United States Patent
Edwards

(10) Patent No.: US 10,699,022 B1
(45) Date of Patent: *Jun. 30, 2020

(54) INTERCEPTION OF UNAUTHORIZED COMMUNICATIONS IN AN CONTROLLED-ENVIRONMENT FACILITY

(71) Applicant: Securus Technologies, Inc., Carrollton, TX (US)

(72) Inventor: Adam C. Edwards, Fort Worth, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,011

(22) Filed: Mar. 13, 2018

Related U.S. Application Data

(63) Continuation of application No. 14/082,550, filed on Nov. 18, 2013, now Pat. No. 9,916,462.

(51) Int. Cl.
*H04L 29/06* (2006.01)
*G06F 21/60* (2013.01)

(52) U.S. Cl.
CPC .................. *G06F 21/606* (2013.01)

(58) Field of Classification Search
CPC ..................................... G06F 21/606
See application file for complete search history.

(56) References Cited

U.S. PATENT DOCUMENTS

| 5,774,533 A * | 6/1998 | Patel ..................... H04M 15/00 379/114.01 |
| 6,052,454 A * | 4/2000 | Kek ..................... H04M 1/6505 379/188 |
| 6,115,384 A * | 9/2000 | Parzych .................. H04L 29/06 370/401 |
| 6,661,879 B1 * | 12/2003 | Schwartz .......... H04M 3/42221 379/100.05 |
| 6,763,465 B1 * | 7/2004 | Kelley ..................... G06F 21/78 380/257 |
| 7,039,171 B2 * | 5/2006 | Gickler ................... G06F 21/55 379/112.01 |
| 7,085,359 B2 * | 8/2006 | Crites ..................... G06F 21/55 379/112.01 |
| 7,529,357 B1 * | 5/2009 | Rae ........................ H04M 3/38 370/261 |
| 7,788,720 B2 | 8/2010 | Patil et al. |
| 8,000,269 B1 * | 8/2011 | Rae ........................ H04M 3/38 370/269 |

(Continued)

OTHER PUBLICATIONS

Bisson et al., Methods for the Prevention of the Use of Mobile Phones in Correctional Institutions, 2012, Crown.*

*Primary Examiner* — David Garcia Cervetti
(74) *Attorney, Agent, or Firm* — Fogarty LLP

(57) ABSTRACT

The present embodiments describe methods and systems for intercepting unauthorized communications in a controlled-environment facility. Unauthorized communications may originate from contraband cell phones, for example. In an embodiment, attempted communications from the contraband communication device are intercepted by the facility communication systems. The attempted communication may or may not be connected or completed, depending upon facility rules, policies, and regulations.

17 Claims, 5 Drawing Sheets

(56) References Cited

U.S. PATENT DOCUMENTS

| | | | | |
|---|---|---|---|---|
| 8,019,354 B2* | 9/2011 | Rae | H04W 64/003 | 455/456.1 |
| 8,023,425 B2* | 9/2011 | Raleigh | H04M 15/80 | 370/252 |
| 8,131,281 B1* | 3/2012 | Hildner | H04L 41/0806 | 455/418 |
| 8,209,758 B1* | 6/2012 | Doukhvalov | H04L 67/306 | 726/24 |
| 8,490,176 B2 | 7/2013 | Book et al. | | |
| 8,589,541 B2 | 11/2013 | Raleigh et al. | | |
| 8,712,396 B2 | 4/2014 | Lotter et al. | | |
| 9,143,610 B2* | 9/2015 | Hodge | H04M 1/67 | |
| 9,426,303 B1* | 8/2016 | Edwards | H04M 11/00 | |
| 9,686,236 B2* | 6/2017 | Lukin | H04L 63/02 | |
| 9,916,462 B1* | 3/2018 | Edwards | G06F 21/606 | |
| 10,027,797 B1* | 7/2018 | Hodge | H04M 3/2218 | |
| 10,104,710 B1* | 10/2018 | Hodge | H04W 12/0027 | |
| 10,115,080 B2* | 10/2018 | Martinez | G06Q 30/04 | |
| 2004/0019700 A1* | 1/2004 | Ilan | H04L 29/06027 | 709/249 |
| 2004/0029564 A1* | 2/2004 | Hodge | H04M 1/67 | 455/411 |
| 2005/0166072 A1 | 7/2005 | Converse et al. | | |
| 2005/0233733 A1* | 10/2005 | Roundtree | G06F 9/45512 | 455/414.1 |
| 2005/0250470 A1* | 11/2005 | Wen | H04W 8/24 | 455/405 |
| 2006/0041657 A1* | 2/2006 | Wen | H04W 8/22 | 709/224 |
| 2007/0263785 A1* | 11/2007 | Williams | H04M 3/42221 | 379/67.1 |
| 2007/0293199 A1* | 12/2007 | Roundtree | G06F 9/45512 | 455/414.1 |
| 2008/0057976 A1* | 3/2008 | Rae | H04W 64/003 | 455/456.1 |
| 2008/0072289 A1* | 3/2008 | Aoki | H04L 43/0811 | 726/3 |
| 2008/0120611 A1* | 5/2008 | Aaron | G06F 21/51 | 717/174 |
| 2008/0132226 A1* | 6/2008 | Carnall | H04L 63/30 | 455/425 |
| 2009/0003568 A1* | 1/2009 | Koretsky | H04M 1/658 | 379/142.01 |
| 2009/0228383 A1* | 9/2009 | Martinez | G06Q 30/04 | 705/35 |
| 2009/0249460 A1* | 10/2009 | Fitzgerald | G06F 21/88 | 726/7 |
| 2009/0249497 A1* | 10/2009 | Fitzgerald | H04W 12/12 | 726/35 |
| 2009/0253406 A1* | 10/2009 | Fitzgerald | G06F 21/88 | 455/410 |
| 2009/0253408 A1* | 10/2009 | Fitzgerald | G06F 21/316 | 455/411 |
| 2009/0253410 A1* | 10/2009 | Fitzgerald | G06F 21/88 | 455/411 |
| 2009/0286506 A1* | 11/2009 | Gu | H04L 12/66 | 455/406 |
| 2009/0325615 A1* | 12/2009 | McKay | H04L 63/02 | 455/466 |
| 2010/0130178 A1* | 5/2010 | Bennett | H04L 63/30 | 455/414.1 |
| 2010/0130182 A1* | 5/2010 | Rosen | G06K 9/00785 | 455/414.1 |
| 2010/0134299 A1* | 6/2010 | Fitzgerald | G06F 21/88 | 340/573.1 |
| 2010/0138298 A1* | 6/2010 | Fitzgerald | G06F 21/88 | 705/14.53 |
| 2010/0188994 A1* | 7/2010 | Raleigh | H04L 9/32 | 370/252 |
| 2011/0076990 A1* | 3/2011 | Silva | H04M 3/42221 | 455/412.1 |
| 2011/0077022 A1* | 3/2011 | Scovill | H04L 41/12 | 455/456.1 |
| 2011/0206038 A1* | 8/2011 | Hodge | H04M 3/2281 | 370/352 |
| 2011/0244832 A1* | 10/2011 | Silva | H04W 4/16 | 455/412.1 |
| 2011/0250870 A1* | 10/2011 | Silva | H04L 12/1831 | 455/412.1 |
| 2011/0293082 A1* | 12/2011 | Gauri | H04M 1/57 | 379/142.02 |
| 2011/0314145 A1* | 12/2011 | Raleigh | H04L 63/10 | 709/224 |
| 2012/0015632 A1* | 1/2012 | Silva | H04L 12/1831 | 455/412.1 |
| 2012/0099714 A1* | 4/2012 | Hodge | H04M 3/2281 | 379/88.16 |
| 2012/0172004 A1* | 7/2012 | Silva | H04L 12/1831 | 455/412.1 |
| 2012/0237908 A1* | 9/2012 | Fitzgerald | G06F 21/88 | 434/236 |
| 2012/0259786 A1* | 10/2012 | Cowan, II | H04N 21/2542 | 705/310 |
| 2013/0073729 A1* | 3/2013 | Yun | G06F 11/302 | 709/225 |
| 2013/0089025 A1* | 4/2013 | Titcombe | H04Q 3/0045 | 370/328 |
| 2013/0132854 A1* | 5/2013 | Raleigh | G06F 3/0482 | 715/738 |
| 2013/0347094 A1* | 12/2013 | Bettini | G06F 21/577 | 726/11 |
| 2014/0007222 A1* | 1/2014 | Qureshi | H04L 67/10 | 726/16 |
| 2014/0073291 A1* | 3/2014 | Hildner | H04L 41/0806 | 455/411 |
| 2014/0113593 A1* | 4/2014 | Zhou | H04L 63/20 | 455/411 |
| 2015/0017961 A1* | 1/2015 | Bennett | H04M 3/42221 | 455/417 |
| 2015/0113605 A1* | 4/2015 | Henderson | G06Q 50/01 | 726/4 |
| 2015/0281433 A1* | 10/2015 | Gainsboro | H04M 3/2281 | 379/88.01 |
| 2016/0352893 A1* | 12/2016 | Bennett | H04M 3/2281 | |
| 2018/0034957 A1* | 2/2018 | Talbot | H04M 3/2281 | |
| 2018/0295562 A1* | 10/2018 | Hodge | H04W 24/10 | |

* cited by examiner

INTERCEPTION OF UNAUTHORIZED COMMUNICATIONS IN AN CONTROLLED-ENVIRONMENT FACILITY

CROSS-REFERENCE TO RELATED APPLICATION

This is a continuation of, and claims benefit of, U.S. patent application Ser. No. 14/082,550, entitled, "Interception of Unauthorized Communications in a Controlled-Environment Facility," filed Nov. 18, 2013 and issued as U.S. Pat. No. 9,916,462 on Mar. 13, 2018, which is hereby incorporated herein by reference.

This application is related by subject matter to U.S. patent application Ser. No. 14/082,509 entitled "Remote Extraction of Data from a Contraband Communication Device," which was filed on Nov. 18, 2013, the disclosure of which is incorporated herein in its entirety.

BACKGROUND

The use of contraband communication devices within controlled-environment facilities poses a risk to facility security, an avenue for continued criminal activity for inmates, and additionally a loss in revenues for facility operators and administration. Inmates may obtain access to contraband devices through many different sources. Family and friends are a potential source. Similarly, facility staff may be a potential source of contraband devices. For example, there have been past instances of inmates, or associates of inmates, paying a member of prison staff to smuggle a contraband communication device, such as a cell phone, into the facility.

Inmates may use the contraband communication device to circumvent facility communication systems, which are often monitored. For example, an inmate may use a contraband cell phone to contact gang affiliates in an attempt to direct further criminal activity from within the facility. In another example, an inmate may use a contraband smartphone or tablet device to access illegal images, including images of child pornography. In another example, an inmate may use the contraband communication device to contact friends and family in an effort to avoid payment of communications fees. Many other illegal or illicit acts may be perpetrated by use of contraband communication devices.

During the course of the communications, inmates may make incriminating admissions, commit further criminal acts, conspire to commit further criminal acts, or leave a trail of incriminating data. Ordinarily, these actions and admissions may be monitored by facility communication systems and investigators. By circumventing the facility communication system, however, it may not be possible to monitor such activities.

Additionally, facilities typically make use of revenues derived from an inmate's use of facility communication systems to operate, update, and maintain the facility communications system. When an inmate circumvents the facility communication systems, financial revenue is lost, which could otherwise benefit the facility and other inmates and administration thereof.

SUMMARY

Embodiments of methods and systems for interception of unauthorized communications in a controlled-environment facility are presented. In one embodiment, a method includes intercepting an attempted communication of an unauthorized communication device operating within a controlled-environment facility. The method may also include routing the attempted communication to a communications processing system associated with the controlled-environment facility.

In an embodiment, the method may also include blocking the attempted communication. Alternatively, the method may include facilitating the communication through the communications processing system. In such an embodiment, the method may additionally include covertly monitoring the communication.

Also, the method may include presenting an admonishment to the user of the unauthorized communication device to warn the user that the attempted communication has been intercepted. In an embodiment, the admonishment includes a warning that the attempted communication may be monitored. In another embodiment, the admonishment includes a warning that charges will apply for the attempted communication. In such an embodiment, the method may further include obtaining account information for applying charges associated with the attempted communication.

In an embodiment, the method may include installing a surveillance utility on the unauthorized communication device. In such embodiments, the method includes recording information associated with the attempted communication in a data storage device.

Embodiments of systems are also presented. In one embodiment, a system includes a communication processing system configured to process communications to and from communication devices within a controlled-environment facility. Such an embodiment may also include communication security device coupled to the communication processing system, the communication security device configured to intercept an attempted communication of an unauthorized communication device operating within a controlled-environment facility, and route the attempted communication to the communications processing system associated with the controlled-environment facility.

BRIEF DESCRIPTION OF THE DRAWINGS

Figure 1:
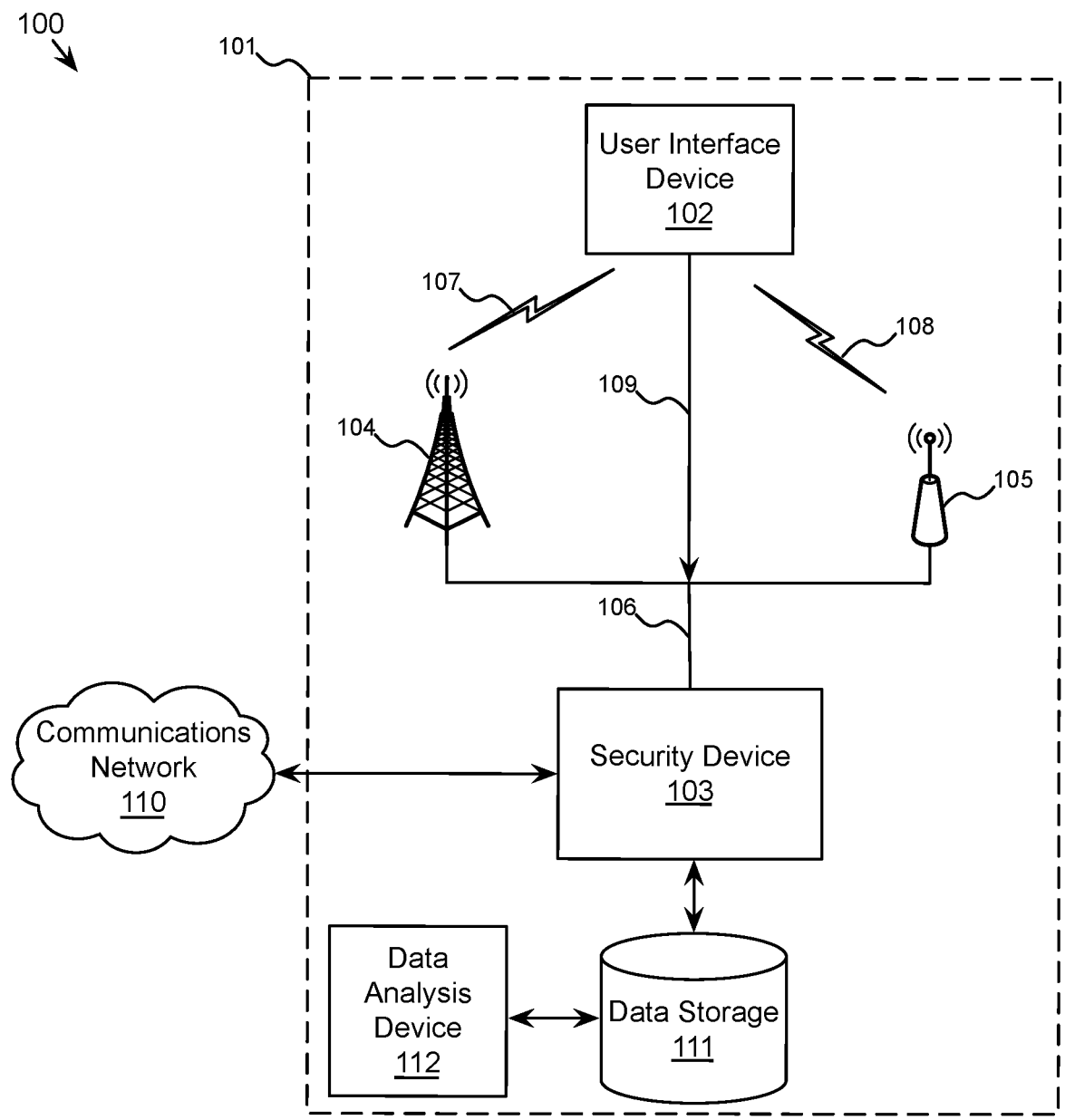

Having thus described the invention in general terms, reference will now be made to the accompanying drawings, which are not necessarily drawn to scale, and wherein:

FIG. 1 is a schematic block diagram illustrating one embodiment of a system for interception of unauthorized communications in a controlled-environment facility.

Figure 2:
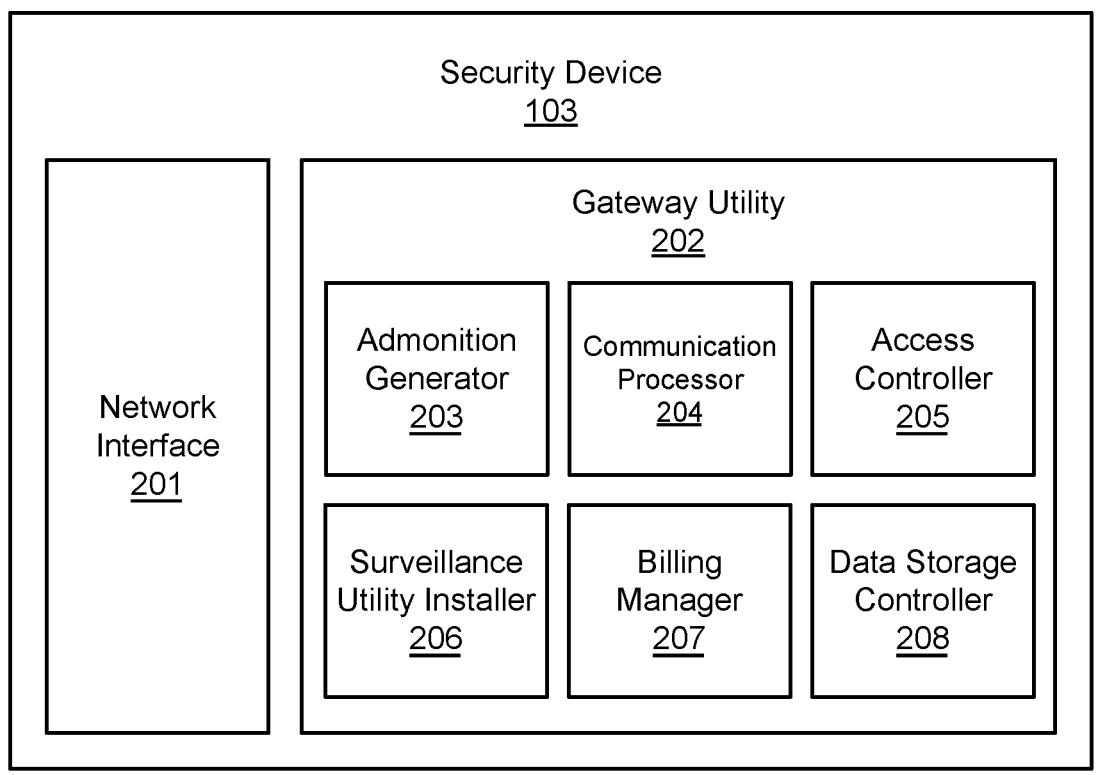

FIG. 2 is a schematic block diagram illustrating one embodiment of an apparatus for interception of unauthorized communications in a controlled-environment facility.

Figure 3:
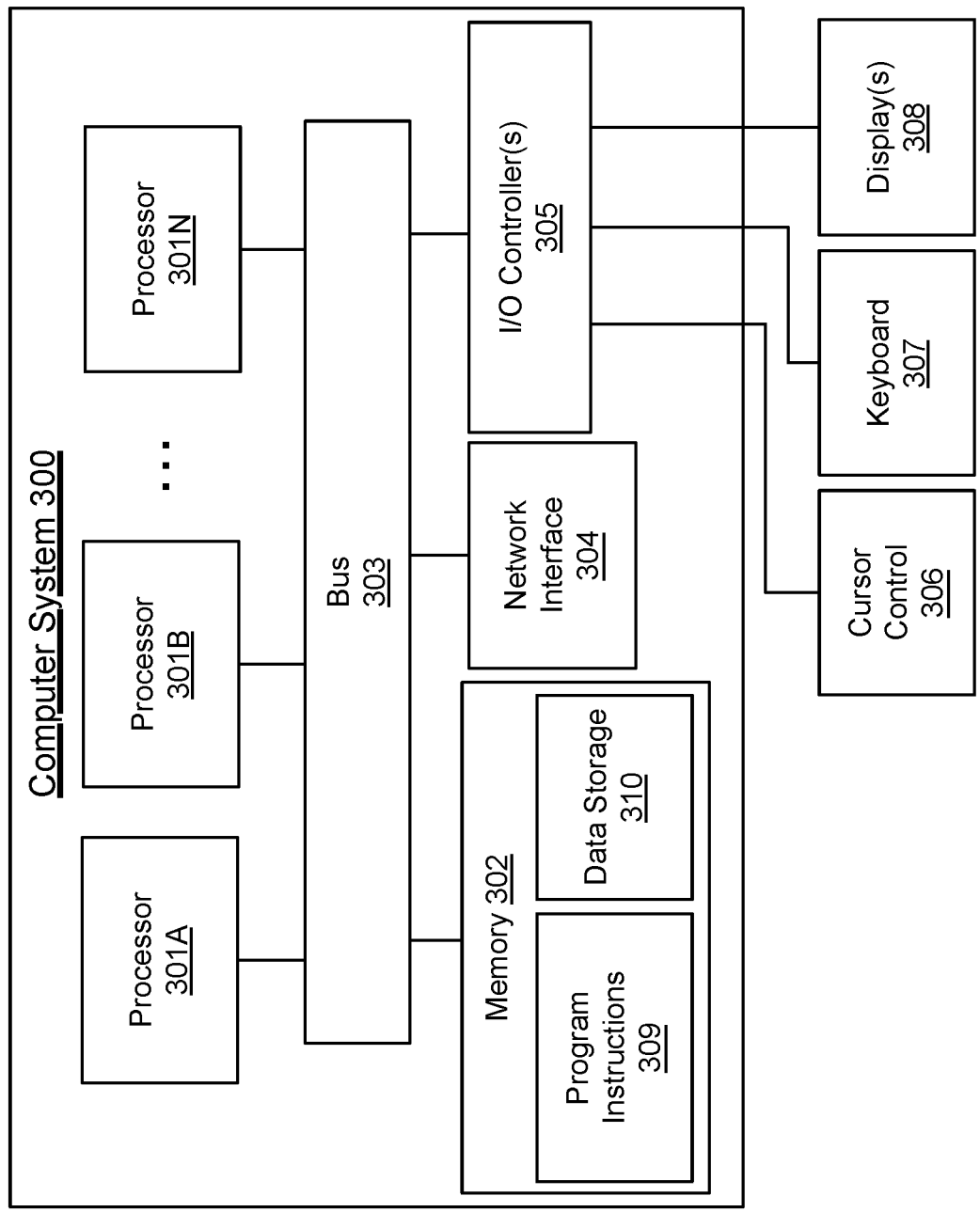

FIG. 3 is a schematic block diagram illustrating one embodiment of a computer system configurable for use according to the present embodiments.

Figure 4:
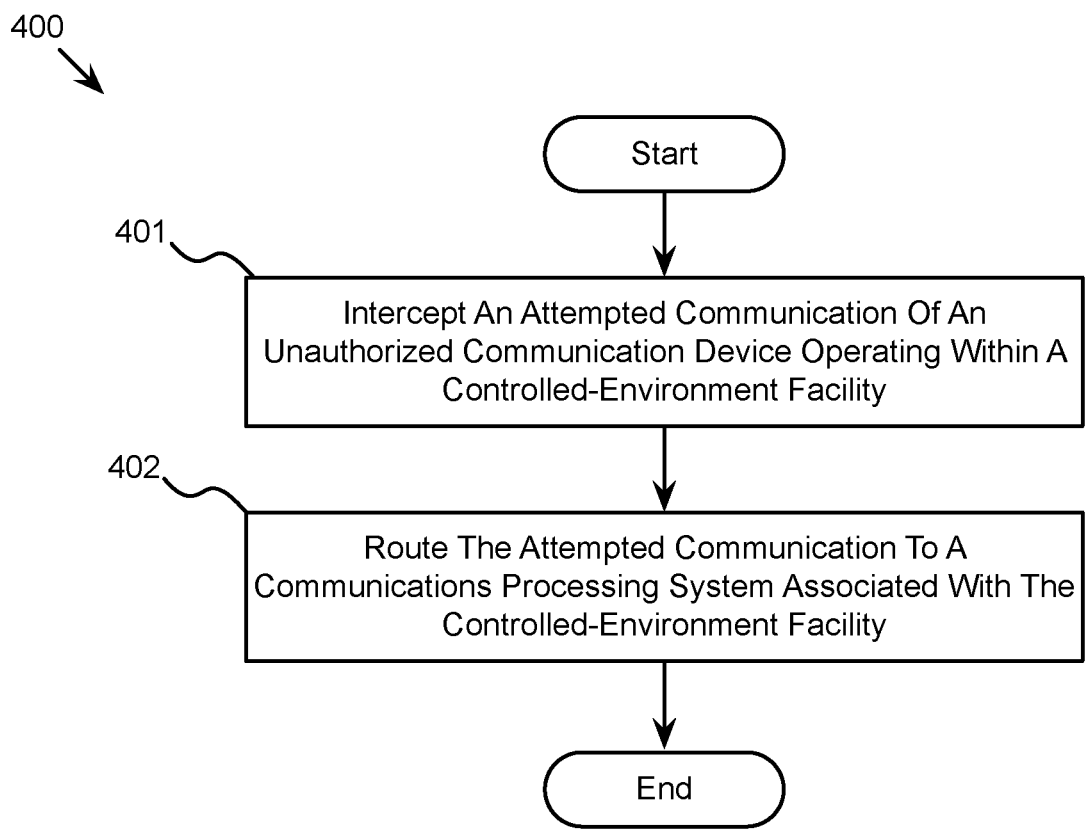

FIG. 4 is a schematic flowchart diagram illustrating one embodiment of a method for interception of unauthorized communications in a controlled-environment facility.

Figure 5:
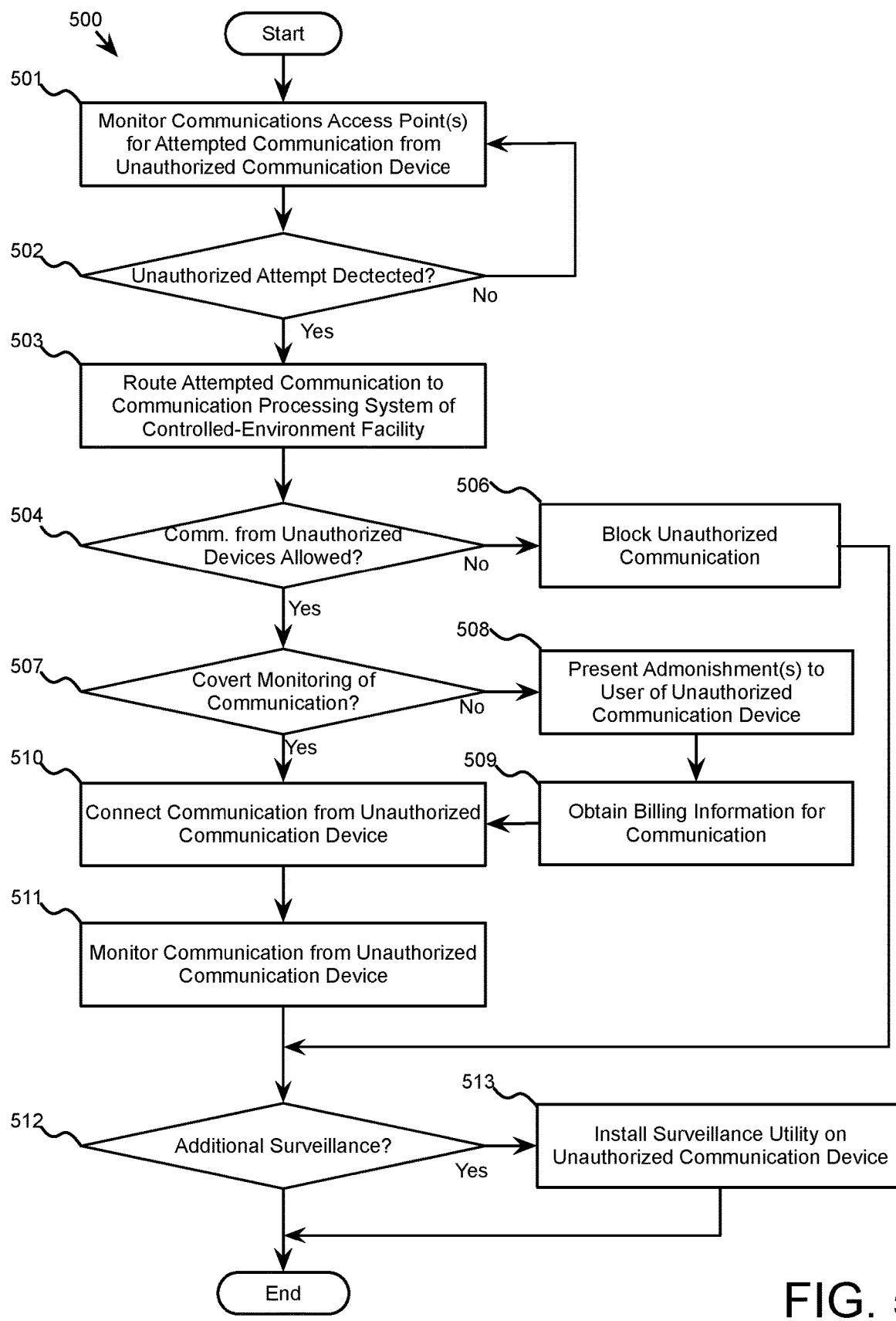

FIG. 5 is a schematic flowchart diagram illustrating another embodiment of a method for interception of unauthorized communications in a controlled-environment facility.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present embodiments describe methods and systems for intercepting unauthorized communications in a controlled-environment facility. Unauthorized communications may originate from contraband cell phones, for example. In an embodiment, attempted communications from the contraband communication device are intercepted by the facility communication systems. The attempted communication may or may not be connected or completed, depending upon facility rules, policies, and regulations.

Beneficially, such embodiments may allow the facility to block unauthorized communications. Alternatively, the communications may be allowed, but the communications may be monitored and billed for as though the unauthorized were a standard facility communication device. A further benefit is the ability to install surveillance utilities on the unauthorized user interface device and obtain data therefrom.

FIG. 1 illustrates one embodiment of a system 100 for intercepting unauthorized communications in a controlled-environment facility 101. In the depicted embodiment, the contraband communication device is illustrated as user interface device 102. One of ordinary skill will recognize that user interface device 102 may include, for example, a cell phone, a smartphone device, a tablet computer device, a laptop computer device, etc.

In the embodiment of FIG. 1, the user interface device 102 may attempt to access communications network 110 via a data or voice connection. For example, user interface device 102 may attempt to access communications network 110 via a mobile data connection 107 to cellular data access point 104. In another embodiment, user interface 102 may attempt to access communication network 110 via a wireless data connection 108 to wireless data network access point 105. In still a further embodiment, user interface device 102 may connect to communications network 110 via a wired connection 109 to intra-facility wire-line communications infrastructure 106.

One of ordinary skill in the art will recognize that mobile data connection may be, for example, a 3GPP Long Term Evolution (LTE) data connection, a Code Division Multiple Access (CDMA) data connection, or the like. Embodiments of wireless data network connection 107 may include WiFi, WiMax, or the like. Embodiments of wire-line communication networks 109 may include, for example, Internet Protocol (IP) networks implemented via Ethernet infrastructure. Alternatively, wired connections 109 may include Plain Old Telephone Service (POTS) network infrastructure, or the like.

Ordinarily, access points 104-106 may connect a user interface device 102 to communications network 110 by means of various additional network infrastructure, including routers, switches, repeaters, gateway devices, firewall appliances, etc. In one embodiment, such infrastructure may include a security device 103. In one embodiment, communications originating from within the controlled-environment facility may be directed through security device 103 before being routed to communications network 110.

In embodiments involving a cellular data access point 104, a dedicated cellular data access point 104 may be placed within or near the controlled-environment facility such that all user interface devices within the facility identify the cellular data access point 104 as the primary base station for the communications cell. In certain embodiments, the power levels associated with the cellular data access point 104 may be adjusted such that the geographical area of the communications cell corresponds with the area of the controlled-environment facility 101. Thus, all cellular communications originating from within the controlled-environment facility 101 may be directed through security device 103 or another embodiment of a communications interception device, such as a communications processing system.

In embodiments having a wireless access point 105, certain access points 105 may be placed in or near the controlled-environment facility 101 which may have security features disabled. Security features which may be disabled include Wired Equivalent Privacy (WEP) or WiFi Protected Access (WPA) password requirements, or Media Access Control (MAC) and/or IP address filtering. In such embodiments, wireless access points 105 having security features disabled may be referred to as "open" access points. In one embodiment, one or more open access points 105 may be positioned in or around the controlled environment facility 101 and configured as decoys. For example, the decoy wireless access points 105 may be configured with a non-threatening or decoy Service Set Identifier (SSID) which may lead an inmate to a false impression that he or she has accessed an external network. In such embodiments, however, all communications with wireless access point 105 may be directed through security device 103.

Wired connections 109 may include tapping, porting, tying, hacking or other forms of unauthorized access to wired infrastructure of the controlled-environment facility 101. In such embodiments, all wired communications may be directed through security device 103.

Security device 103 may perform a variety of security and/or surveillance functions. For example, security device 103 may facilitate monitoring of communications from user interface device 102. Security device 103 may block unauthorized attempts to communicate with communications network 110. Security device 103 may route communications from user interface device 102 through facility communication systems for monitoring, billing, etc.

In still further embodiments, security device 103 may collect information related to the attempted access to communications network 110, including the date, time, and nature of the communication. For example, the security device 103 may record whether the attempted communication was a telephone call, an email, a text message, an attempt to access a website, etc. The security device 103 may further record details of the attempted communication, including a telephone number, email address, web address associated with the attempted communication.

In a further embodiment, security device 103 may store details of attempted communications, including for example, recordings of telephone calls, video, images, website access records, etc. in a data storage device 111. Data storage device 111 may be a dedicated data storage repository. Alternatively, data storage device 111 may be a hard drive associated with a server or other computing device. In another embodiment, data storage device 111 may be a system of data storage components comprising, for example, a Storage Area Network (SAN). Data storage device 111 may store the data obtained by security device 103 in association with a database.

In still a further embodiment, a data analysis device 112 may access the data stored on the data storage device 111 to derive intelligence from data obtained from the user interface device 102. For example, data analysis device 112 may create a linking database to identify relationships between contacts stored in the communication device. Data analysis device 112 may also identify a list of persons, telephone numbers, addresses, or websites associated with a criminal activity in response to the data collected by security device 103 from user interface device 102.

FIG. 2 illustrates one embodiment of an apparatus for intercepting unauthorized communications in a controlled-environment facility 101. In one embodiment, the apparatus may comprise the security device 103 described above in FIG. 1. One of ordinary skill will recognize that alternative embodiments may be implemented. For example, in systems involving mobile data networks, network interface 201 and the gateway utility 202 may be implemented on a Mobility Management Entity (MME), a Serving Gateway (SGW), a PDN Gateway (PGW), etc. In a WiFi network, the gateway utility may be incorporated with a Wireless Access Point (WAP) router device or on a stand-alone network appliance. One of ordinary skill will recognize many alternative implementations depending upon the network architecture involved.

In an embodiment, the security device 103 may include a network interface 201 and a gateway utility 202. The gateway utility 202 may include one or more modules collectively configured to facilitate intercepting unauthorized communications in the controlled-environment facility 101. For example, the gateway utility 202 may include an admonition generator 203, a communication processor 204, an access controller 205, a surveillance utility installer 206, a billing manager 207, and a data storage controller 208. One of ordinary skill will recognize that the gateway utility 202 may include additional components or fewer components, depending upon specific system configurations and functionality.

In an embodiment, network interface 201 may include components and modules used to connect the security gateway device 103 to a communications network and to intercept the attempted communication from user interface device 102. For example, network interface 201 may include a cellular data network interface, a WiFi network interface, a telephone communications network interface, an Internet Protocol (IP) network interface, or the like.

Gateway utility 202 may generally operate to intercept an attempted communication of user interface device 102 in embodiments where user interface device 102 is a contraband or unauthorized communication device, such as a cell phone. Gateway utility 202 may additionally route the attempted communication to a communications processing system associated with the controlled-environment facility 101. In another embodiment, the gateway utility 202 may handle processing of the attempted communication, using for example, communication processor 204.

In an embodiment, communication processor 204 is configured to determine whether the attempted communication is authorized, whether the attempted communication may be completed, and whether additional functions may be performed on the attempted communication. For example, communication processor 204 may determine whether the attempted communication is to be monitored, whether admonishments are to be presented to the user interface device 102, whether billing will apply to the attempted communication, whether further surveillance is required, etc. In general, the communication processor 204 may reference a set of predetermined policies or rules associated with intercepted communications. The policies or rules may reflect the preferences of the administration of the controlled-environment facility 101.

In an embodiment, communication processor 204 may determine whether the attempted communication may be completed or not. In response to the determination, the access controller 205 may either complete the communication or block the communication as instructed by the communication processor 204. For example, the communication processor 204 may determine that a call from an unauthorized user interface device 102, such as a cell phone, will be connected to a called party, but with covert monitoring. In such an embodiment, the access controller 205 may connect the call from the unauthorized cell phone to the called party. In another embodiment, the communication processor 204 may determine that all calls from an unauthorized cell phone are to be blocked, and the access controller 205 may block the call from the unauthorized cell phone to the called party. In such an embodiment, the access controller 205 may interact with the network interface 201 for connecting or blocking the attempted communication.

In one embodiment, the access controller 205 may record and/or monitor the attempted communication once it is connected or completed. Additionally, the access controller 205 may record and/or monitor any information collected from the attempted communication before it is completed. In still a further embodiment, the access controller 205 may forward the attempted communication, or a copy thereof, to a live agent or third-party monitoring or recording utility.

Additionally, the communication processor 204 may determine, based upon facility policies for example, that the admonition generator 203 must present admonishments to the user interface device 102. For example, the admonition generator 203 may play a recorded message containing various admonishments, including warnings that the attempted communication has been intercepted, that charges will apply to the attempted communication, that the attempted communication will be monitored and/or recorded, that the attempted communication was generated by a contraband or unauthorized user interface device 102, and/or that a surveillance utility will be installed on the user interface device 102. Of course, one of ordinary skill in the art will recognize that some or all of these admonishments may be omitted. Additionally, one of ordinary skill will recognize additional methods for presenting the admonishments, including displaying text on a screen of the user interface device, connecting the user interface device to a live agent for presenting the admonishments, etc. In still a further embodiment, the admonishments may be interactive, requiring responses from the user. Responses may include agreement to terms of use, provision of billing information, provision of identification information, etc.

In embodiments where charges will apply to the attempted communication, a billing manager 207 may collect billing information from a user of the user interface device 102 and arrange for collection of payment from the user in exchange for completing the attempted communication. In an embodiment, the billing manager 207 may receive billing information, including account information, credit card information, identification information, etc. and process the payment before the access controller 205 is authorized to complete the attempted communication.

In an embodiment, the surveillance utility installer 206 may install a surveillance utility on the user interface device 102 in response to the attempted communication. The surveillance utility may gather data from the user interface and communicate that data back to the security device 103. Examples of a surveillance utility and methods of operation which may be used in accordance with the present embodiments are described in co-pending U.S. patent application Ser. No. 14/082,509 entitled "Remote Extraction of Data from a Contraband Communication Device," which was filed on Nov. 18, 2013, the disclosure of which is incorporated herein in its entirety.

Data storage controller 208 may handle storage of data associated with the attempted communication intercepted by the gateway utility. For example, the data storage controller 208 may store recordings of the attempted communication, information obtained from the user in response to admonishments, billing information, and other information which may be logged for evidence, investigation, or proof of compliance with various rules and regulations governing the controlled-environment facility. Additionally, data storage controller 208 may store data obtained from the surveillance utility stored on the user interface device by the surveillance utility installer 206. In such embodiments, the data storage controller 208 may store the information on data storage device 111, for example.

FIG. 3 is a schematic block diagram illustrating one embodiment of a computer system 300 configurable for intercepting unauthorized communications in a controlled-environment facility 101. In one embodiment, user interface device 102, security device 103, data analysis device 112, etc. may be implemented on a computer system similar to the computer system 300 described in FIG. 3. Similarly, surveillance utility 202 may be implemented on a computer system similar to the computer system 300 described in FIG. 3. In various embodiments, computer system 300 may be a server, a mainframe computer system, a workstation, a network computer, a desktop computer, a laptop, or the like.

As illustrated, computer system 300 includes one or more processors 301A-N coupled to a system memory 302 via bus 303. Computer system 300 further includes network interface 304 coupled to bus 303, and input/output (I/O) controller(s) 305, coupled to devices such as cursor control device 306, keyboard 307, and display(s) 308. In some embodiments, a given entity (e.g., user interface device 102) may be implemented using a single instance of computer system 300, while in other embodiments multiple such systems, or multiple nodes making up computer system 300, may be configured to host different portions or instances of embodiments (e.g., security device 103, communication network 110, data analysis device 112, etc.).

In various embodiments, computer system 300 may be a single-processor system including one processor 301A, or a multi-processor system including two or more processors 301A-N (e.g., two, four, eight, or another suitable number). Processor(s) 301A-N may be any processor capable of executing program instructions. For example, in various embodiments, processor(s) 301A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 301A-N may commonly, but not necessarily, implement the same ISA. Also, in some embodiments, at least one processor(s) 301A-N may be a graphics processing unit (GPU) or other dedicated graphics-rendering device.

System memory 302 may be configured to store program instructions and/or data accessible by processor(s) 301A-N. For example, memory 302 may be used to store software program and/or database shown in FIGS. 4-5. In various embodiments, system memory 302 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 302 as program instructions 309 and data storage 310, respectively. In other embodiments, program instructions and/or data may be received, sent or stored upon different types of computer-accessible media or on similar media separate from system memory 302 or computer system 300. Generally speaking, a computer-accessible medium may include any tangible, non-transitory storage media or memory media such as electronic, magnetic, or optical media—e.g., disk or CD/DVD-ROM coupled to computer system 300 via bus 303, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 303 may be configured to coordinate I/O traffic between processor 301, system memory 302, and any peripheral devices including network interface 304 or other peripheral interfaces, connected via I/O controller(s) 305. In some embodiments, bus 303 may perform any necessary protocol, timing or other data transformations to convert data signals from one component (e.g., system memory 302) into a format suitable for use by another component (e.g., processor(s) 301A-N). In some embodiments, bus 303 may include support for devices attached through various types of peripheral buses, such as a variant of the Peripheral Component Interconnect (PCI) bus standard or the Universal Serial Bus (USB) standard, for example. In some embodiments, the operations of bus 303 may be split into two or more separate components, such as a north bridge and a south bridge, for example. In addition, in some embodiments some or all of the operations of bus 303, such as an interface to system memory 302, may be incorporated directly into processor(s) 301A-N.

Network interface 304 may be configured to allow data to be exchanged between computer system 300 and other devices, such as other computer systems attached to network interface 201, for example. In various embodiments, network interface 304 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 305 may, in some embodiments, enable connection to one or more display terminals, keyboards, keypads, touch screens, scanning devices, voice or optical recognition devices, or any other devices suitable for entering or retrieving data by one or more computer system 300. Multiple input/output devices may be present in computer system 300 or may be distributed on various nodes of computer system 300. In some embodiments, similar I/O devices may be separate from computer system 300 and may interact with computer system 300 through a wired or wireless connection, such as over network interface 304.

As shown in FIG. 3, memory 302 may include program instructions 309, configured to implement certain embodiments described herein, and data storage 310, comprising various data accessible by program instructions 309. In an embodiment, program instructions 309 may include software elements of embodiments illustrated in FIGS. 4-5. For example, program instructions 309 may be implemented in various embodiments using any desired programming language, scripting language, or combination of programming languages and/or scripting languages. Data storage 310 may include data that may be used in these embodiments such as, for example, data collected by data communication processor 204. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Embodiments of gateway utility 202 described in FIG. 2 may be implemented in a computer system that is similar to computer system 300. In one embodiment, the elements described in FIG. 2 may be implemented in discrete hardware modules. Alternatively, the elements may be implemented in software-defined modules which are executable by one or more of processors 301A-N, for example.

FIG. 4 is a schematic flowchart diagram illustrating one embodiment of a method 400 for interception of unauthorized communications in a controlled-environment facility 101. In an embodiment, the method 400 starts when security device 103 intercepts an attempted communication of an unauthorized communication device operating within the controlled-environment facility 101 as shown at block 401. Once the attempted communication is intercepted, the security device 103 may route the attempted communication to a communication processing system associated with the controlled-environment facility 101 as shown at block 402. In one embodiment, the security device 103 may be integrated with the communication processing system. In another embodiment, the security device 103 may be a discrete device.

FIG. 5 is a schematic flowchart diagram illustrating another embodiment of a method 500 for interception of unauthorized communications in a controlled-environment facility 101. In an embodiment, the method 500 starts with the gateway utility 202 monitoring the network interface 201 connected to communications access points 104-106 to identify an attempted communication from an unauthorized user interface device 102 as shown at block 501. As long as no attempted communication is detected, the gateway utility continues to monitor via network interface 201 as shown at block 502. Once the attempted communication is detected at block 502, then the gateway utility 202 may route the attempted communication to a processing system of the controlled environment facility 101 as shown at block 503. In an embodiment the communication processing system is separate from the security device 103. In another embodiment, the security device 103 is incorporated with the communication processing system. For example, communication processor 204 may comprise, at least a portion of the communication processing system.

At block 504, the communication processor 204 may determine whether communications from the unauthorized device is allowed. For example, the communication processor 204 may reference policies or rules associated with unauthorized communications. If the communication is not allowed, the access controller 205 may block the unauthorized communication as shown at block 506. If, however, the attempted communication is allowed, the communication processor 204 may further determine whether covert monitoring is required as shown at block 507. If covert monitoring is required or allowed, the admonition generator 203 may remain silent as to admonishments to the user of the unauthorized user interface device 102. If the monitoring is not to be covert, then the admonition generator 203 may present admonishment(s) to the user of the unauthorized user interface device 102 as shown at block 508. In a further embodiment, the billing manager 207 may additionally obtain billing information for the communication as shown at block 509.

The access controller 205 may then connect or complete the communication from the unauthorized user interface device 102 as shown at block 510. The gateway utility 202 may monitor the communication from the unauthorized communication device as shown at block 511. Monitoring may include recording, scanning for key words, flagging the communication for later review, or connecting the communication to a live agent for monitoring or investigation.

In a further embodiment, the method 500 may include determining whether additional surveillance of the user interface device 102 is desired or required as shown at block 512. If additional surveillance is desired, the surveillance utility installer 206 may be installed on the user interface device 102 via the network connection 107-109 as shown at block 513. The surveillance utility may report data back to the security device for recordation on the data storage device 111 as described in U.S. patent application Ser. No. 14/082,509 entitled "Remote Extraction of Data from a Contraband Communication Device," which was filed on Nov. 18, 2013, the disclosure of systems and methods therein are incorporated herein in entirety.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:
   intercepting an attempted communication of an unauthorized communication device operating within a controlled-environment facility;
   routing the attempted communication to a communications processing system associated with the controlled-environment facility;
   determining that surveillance of the unauthorized communication device is required by the controlled-environment facility;
   installing a surveillance utility on the unauthorized communication device upon determination that surveillance of the unauthorized communication device is required by the controlled-environment facility;
   connecting or completing the communication through the communications processing system;
   connecting the communication to a live agent; and
   enabling covert monitoring of the communication by the live agent.

2. The method of claim 1, further comprising:
   recording the communication;
   forwarding a resulting recording of the communication to the live agent; and
   enabling investigation of the communication by the live agent.

3. The method of claim 2, wherein recording the communication is carried out via the surveillance utility.

4. The method of claim 1 further comprising monitoring at least one controlled-environment facility communications access point for attempted communications from or to unauthorized communication devices.

5. The method of claim 4 further comprising installing the surveillance utility on the unauthorized communication device via the at least one controlled-environment facility communications access point.

6. The method of claim 1, further comprising:
   determining an admonishment to the user of the unauthorized communication device to warn the user the surveillance utility is being installed on the unauthorized communication device is required by the controlled-environment facility; and
   presenting the admonishment to the user of the unauthorized communication device to warn the user that the surveillance utility is being installed on the unauthorized communication device.

7. A system comprising:
   a communication processing system configured to process communications to and from communication devices within a controlled-environment facility; and
   a communication security device coupled to the communication processing system, the communication security device configured to:
      intercept an attempted communication of an unauthorized communication device operating within a controlled-environment facility;
      determine that surveillance of the unauthorized communication device is required by the controlled-environment facility;
      install a surveillance utility on the unauthorized communication device upon determination that surveillance of the unauthorized communication device is required by the controlled-environment facility;
      route the attempted communication to the communications processing system for connection or completion of the communication through the communications processing system;
      connect the communication to a live agent; and
      enable covert monitoring of the communication by the live agent.

8. The system of claim 7, wherein the communication security device is further configured to monitor at least one controlled-environment facility communications access point for attempted communications from or to unauthorized communication devices.

9. The system of claim 8, wherein the communication security device is further configured to install the surveillance utility on the unauthorized communication device via the at least one controlled-environment facility communications access point.

10. The system of claim 7 wherein the communication security device is further configured to:
    record the communication;
    forward a resulting recording of the communication to the live agent; and
    enable investigation of the communication by the live agent.

11. The system of claim 7, wherein recording of the communication is carried out via the surveillance utility.

12. The system of claim 7, wherein the communication security device is further configured to:
    determine an admonishment to the user of the unauthorized communication device to warn the user the surveillance utility is being installed on the unauthorized communication device is required by the controlled-environment facility; and
    present the admonishment to the user of the unauthorized communication device to warn the user that the surveillance utility is being installed on the unauthorized communication device.

13. A non-transitory computer-readable storage medium having program instructions stored thereon that, upon execution by a controlled-environment facility communication security device coupled to a controlled-environment facility communication processing system, cause the controlled-environment facility communication security device to:
    intercept an attempted communication of an unauthorized communication device operating within the controlled-environment facility;
    route the attempted communication to the communications processing system associated with the controlled-environment facility;
    determine that surveillance of the unauthorized communication device is required by the controlled-environment facility;
    install a surveillance utility on the unauthorized communication device upon determination that surveillance of the unauthorized communication device is required by the controlled-environment facility;
    connect or complete the communication through the communications processing system; and
    enable investigation of the communication by a live agent.

14. The non-transitory computer-readable storage medium of claim 13, wherein the program instructions, upon execution by the controlled-environment facility communication security device further cause the controlled-environment facility communication security device to:
    record the communication, via the surveillance utility; and
    forward a recording of the communication to the same, or another, live agent.

15. The non-transitory computer-readable storage medium of claim 13, wherein the program instructions, upon execution by the controlled-environment facility communication security device further cause the controlled-environment facility communication security device to monitor at least one controlled-environment facility communications access point for attempted communications from or to unauthorized communication devices.

16. The non-transitory computer-readable storage medium of claim 15, wherein the program instructions, upon execution by the controlled-environment facility communication security device further cause the controlled-environment facility communication security device to install the surveillance utility on the unauthorized communication device via the at least one controlled-environment facility communications access point.

17. The non-transitory computer-readable storage medium of claim 13, wherein the program instructions, upon execution by the controlled-environment facility communication security device further cause the controlled-environment facility communication security device to:
- determine an admonishment to the user of the unauthorized communication device to warn the user the surveillance utility is being installed on the unauthorized communication device is required by the controlled-environment facility; and
- present the admonishment to the user of the unauthorized communication device to warn the user that the surveillance utility is being installed on the unauthorized communication device.

* * * * *